United States Patent
Kozyuk

(10) Patent No.: US 10,639,599 B2
(45) Date of Patent: May 5, 2020

(54) METHOD AND DEVICE FOR CAVITATIONALLY TREATING A FLUID

(71) Applicant: Arisdyne Systems, Inc., Cleveland, OH (US)

(72) Inventor: Oleg Kozyuk, North Ridgeville, OH (US)

(*) Notice: Subject to any disclaimer, the term of this patent is extended or adjusted under 35 U.S.C. 154(b) by 627 days.

(21) Appl. No.: 15/440,944

(22) Filed: Feb. 23, 2017

(65) Prior Publication Data

US 2017/0291150 A1 Oct. 12, 2017

Related U.S. Application Data

(60) Provisional application No. 62/321,361, filed on Apr. 12, 2016.

(51) Int. Cl.
| | | |
|---|---|---|
| *B01J 19/00* | (2006.01) | |
| *B01F 5/02* | (2006.01) | |
| *B01F 5/00* | (2006.01) | |
| *B01F 5/06* | (2006.01) | |
| *B01F 11/02* | (2006.01) | |

(52) U.S. Cl.
CPC .......... *B01F 5/0068* (2013.01); *B01F 5/0256* (2013.01); *B01F 5/0281* (2013.01); *B01F 5/0689* (2013.01); *B01F 11/0283* (2013.01); *B01J 19/008* (2013.01); *B01F 2215/0431* (2013.01); *B01F 2215/0463* (2013.01); *B01F 2215/0468* (2013.01); *B01F 2215/0481* (2013.01)

(58) Field of Classification Search
CPC .. B01F 5/0068; B01F 5/0689; B01F 11/0283; B01F 5/0281; B01F 5/0256; B01F 2215/0463; B01F 2215/0431; B01F 2215/0468; B01F 2215/0481; B01J 19/008; B01J 19/10; B01J 2219/0877

See application file for complete search history.

(56) References Cited

U.S. PATENT DOCUMENTS

| | | | | |
|---|---|---|---|---|
| 5,723,518 A | * | 3/1998 | Kahl | ............... B01F 3/0811 523/324 |
| 5,958,495 A | * | 9/1999 | Klinksiek | ............ A01J 11/16 426/519 |
| 7,059,591 B2 | | 6/2006 | Bortkevitch et al. | |

(Continued)

FOREIGN PATENT DOCUMENTS

| | | |
|---|---|---|
| JP | H11216345 A | 8/1999 |
| JP | 2007167557 A | 7/2007 |
| JP | 2011056436 A | 3/2011 |

OTHER PUBLICATIONS

International Search Report and Written Opinion issued in corresponding International Application No. PCT/US2017/019147; dated Feb. 23, 2017.

*Primary Examiner* — Charles Cooley

(57) ABSTRACT

A cavitation device and method for using the same is useful for cavitationally treating fluids by generation of hydrodynamic cavitation in the fluid followed by the subsequent collapse of cavitation bubbles. The passage of fluid through slot openings in a cylindrical insert mounted in a housing provides fluid jets in an annular cavity to induce hydrodynamic cavitation of the fluid. Fluid is discharged from the annular cavity into a downstream portion of the housing to collapse cavitation bubbles under static pressure.

10 Claims, 4 Drawing Sheets

(56) References Cited

U.S. PATENT DOCUMENTS

| | | | | |
|---|---|---|---|---|
| 7,708,453 B2* | 5/2010 | Kozyuk | ............... | B01F 5/0665 |
| | | | | 138/42 |
| 9,290,717 B1 | 3/2016 | Kozyuk et al. | | |
| 9,782,741 B2* | 10/2017 | Kozyuk | ............... | B01J 19/008 |
| 2004/0246815 A1* | 12/2004 | Kozyuk | ............... | B01F 5/0256 |
| | | | | 366/336 |
| 2007/0205307 A1* | 9/2007 | Kozyuk | ............... | B01F 3/0807 |
| | | | | 239/518 |
| 2015/0367313 A1* | 12/2015 | Kozyuk | ............... | B01J 19/008 |
| | | | | 366/108 |
| 2016/0279538 A1* | 9/2016 | Kozyuk | ............ | B01D 19/0042 |
| 2017/0007976 A1 | 1/2017 | Kozyuk | | |
| 2017/0028375 A1 | 2/2017 | Kozyuk | | |
| 2017/0189883 A1* | 7/2017 | Kozyuk | ............... | B01J 19/008 |
| 2017/0291150 A1* | 10/2017 | Kozyuk | ............... | B01F 5/0068 |

* cited by examiner

METHOD AND DEVICE FOR CAVITATIONALLY TREATING A FLUID

This application claims the benefit of U.S. provisional patent application Ser. No. 62/321,361 filed Apr. 12, 2016, the contents of which are incorporated herein in their entirety by reference.

FIELD

The invention relates to a method and device for cavitationally treating a fluid, and in particular, with the aid of hydrodynamic cavitation. This device and method can find application in the chemical, petroleum, food, cosmetic, pharmaceutical and other industries.

BACKGROUND

Cavitation is related to the formation of bubbles and cavities within a liquid. Bubble formation can result from a localized pressure drop in the liquid. For example, if the local pressure of a liquid decreases below its boiling point, vapor-filled cavities and bubbles may form. As the pressure then increases, vapor condensation can occur in the bubbles and they may collapse, creating large pressure impulses and high temperatures. When cavitation is used for the mixing of substances, the process can provide high-shear mixing.

There are many known methods and devices for producing fluid dispersions, in particular, suspensions and emulsions, using the effect of hydrodynamic cavitation on a fluid. In these methods, the emulsification and dispersion processes go on as a result of cavitation influences purposefully created in the process flow as a result of passing the flow through a localized constriction. The mixing, emulsifying and dispersing influences of hydrodynamic cavitation occur as a result of a great number of powerful influences on the processed components resulting from the collapse of the cavitation bubbles.

In the field of cavitation of fluids, including hydrodynamic cavitation, it is known that various devices, using vortex movements of the fluid, are sufficient to reduce the local pressure in a core zone of the vortex to form the cavitation bubbles in the fluid. Typical of the art are those devices disclosed in the following U.S. Pat. Nos. 4,261,521; 5,318,702; 6,797,170; 7,034,067; 7,087,178; 7,357,566; 7,651,614; 7,762,715, and United States Patent Published Application No. 2012/0097280, the contents of all of which are incorporated herein by reference.

The methods and devices disclosed in the aforementioned patents and application have proven efficient and useful for treating fluids and creating fluid dispersions.

To more efficiently treat fluids with hydrodynamic cavitation and provide more effective fluid dispersions, a greater energy conversion, from the cavitational and kinetic dispersing energy to the liquid flow, is desirable.

The present invention addresses a new and improved method and device for cavitationally treating fluids and liquid disperse systems which is simple in design, effective in use, and overcomes the foregoing difficulties and other disadvantages while providing better and more advantageous overall results.

SUMMARY

In a first aspect, a method for cavitationally treating a fluid is provided. The method includes providing a device with a housing having a fluid inlet, a fluid outlet, a chamber-forming portion which defines a cylindrical wall, and a longitudinal axis along the center of the housing. The housing further includes a cylindrical insert mounted coaxially within the chamber-forming portion or part thereof, the cylindrical insert including an internal channel with an inlet opening in fluid communication with the fluid inlet of the housing, the cylindrical insert further including a cylindrical closed end downstream of the inlet opening in the cylindrical insert and at least two slot openings in the cylindrical insert positioned between the inlet opening and the closed end, the at least two slot openings being in fluid communication with the internal channel of the cylindrical insert and an annular cavity positioned between an outer surface of the cylindrical insert and the chamber-forming portion of the housing. The method includes delivering the fluid to be treated into the internal channel of the cylindrical insert; supplying a flow of the fluid through the at least two slot openings into the annular cavity in the form of two primary fluid jets, one through each slot; deflecting each of the two primary fluid jets from the cylindrical wall of the housing to divide each primary fluid jet into two secondary fluid jets directed tangentially along the cylindrical wall of the housing in opposite directions and intersecting the two secondary fluid jets of each primary fluid jet and generating a high intensity vortex movement of the fluid within the annular cavity sufficient to reduce pressure in a zone of the vortex movement to form cavitation bubbles in the fluid in the annular cavity; and discharging the fluid from the annular cavity into the fluid outlet of the housing and collapsing the cavitation bubbles or a portion thereof under static pressure outside of the annular cavity.

In some examples of aspect 1, the two primary fluid jets have a fluid velocity of at least 8 meters per second through each of the at least two slot openings.

In another example of aspect 1, the method further includes the step of repeating the method for cavitationally treating the fluid a plurality of times, for example at least 2, 3 or 4 times, within the housing, and the step of repeating the method a plurality of times includes passing the fluid through a plurality of cylindrical inserts positioned in series, one downstream of another, within the housing. Alternatively, multiple housings each having at least one cylindrical insert can be positioned in series to carry out the method a plurality of times, the method being carried out at least once in each housing.

In another example of aspect 1, the cavitation bubbles are collapsed in the fluid outlet portion of the housing downstream of the exit region of the annular cavity.

In another example of aspect 1, one of the at least two slot openings in the cylindrical insert are capable of orienting fluid flow therethrough perpendicular to the longitudinal axis and the cylindrical wall of the chamber-forming portion of the housing.

In another example of aspect 1, the cylindrical insert is mounted within the housing such that the entire amount of the fluid flowing into the fluid inlet of the housing is directed to and flows through the inlet opening of the cylindrical insert and into the internal channel.

In another example of aspect 1, the at least two slot openings are equally spaced apart in the cylindrical insert. For example, the two slot openings are positioned opposite one another in the wall of the cylindrical insert that defines the internal channel.

In another example of aspect 1, the cylindrical insert has a mounting portion, the mounting portion being in contact with the cylindrical wall of the housing, for example, it is abutted against and in contact with the upstream edge the chamber-forming portion that is perpendicular to the longitudinal axis.

In another example of aspect 1, the mounting portion of the cylindrical insert being an integral extension of a wall portion that forms the inlet opening of the internal channel of the cylindrical insert.

In a second aspect, there is a device, for instance a static device with no moving parts, for cavitationally treating a fluid, the device includes a housing having a fluid inlet, a fluid outlet, a chamber-forming portion which defines a cylindrical wall, and a longitudinal axis; and a cylindrical insert mounted coaxially within said chamber-forming portion, the cylindrical insert having an internal channel with an inlet opening in fluid communication with the fluid inlet of the housing, the cylindrical insert having a closed end downstream of the inlet opening in the cylindrical insert and at least two slot openings in the cylindrical insert positioned between the inlet opening and the closed end, the at least two slot openings being in fluid communication with the internal channel of the cylindrical insert and an annular cavity positioned between an outer surface of the cylindrical insert and the chamber-forming portion of the housing.

In some examples of aspect 2, the device further includes a plurality of cylindrical inserts positioned in series within the housing.

In another example of aspect 2, one of the at least two slot openings in the cylindrical insert being capable of orienting fluid flow therethrough perpendicular to the longitudinal axis and the cylindrical wall of the housing.

In another example of aspect 2, the cylindrical insert mounted within the housing such that the entire amount of the fluid flowing into the fluid inlet of the housing flows into the inlet opening of the cylindrical insert.

In another example of aspect 2, the at least two slot openings are equally spaced apart in the cylindrical insert.

In another example of aspect 2, the cylindrical insert includes a mounting portion, the mounting portion being in contact with the cylindrical wall of the housing.

In another example of aspect 2, the mounting portion of the cylindrical insert being an integral extension of a wall that forms the inlet opening of the internal channel of the cylindrical insert.

Any one of the above aspects (or examples of those aspects) may be provided alone or in combination with any one or more of the examples of that aspect discussed above; e.g., the first aspect may be provided alone or in combination with any one or more of the examples of the first aspect discussed above; and the second aspect may be provided alone or in combination with any one or more of the examples of the second aspect discussed above; and so-forth.

The accompanying drawing is included to provide a further understanding of principles of the disclosure, and is incorporated in and constitutes a part of this specification. The drawing illustrates some examples(s), and together with the description serves to explain, by way of example, principles and operation thereof. It is to be understood that various features disclosed in this specification and in the drawing can be used in any and all combinations. By way of non-limiting example the various features may be combined with one another as set forth in the specification, above, as aspects.

BRIEF DESCRIPTION OF THE DRAWINGS

The above and other features, examples and advantages of aspects of the examples disclosed in the present specification are better understood when the following detailed description thereof is read with reference to the accompanying drawing, in which.

DETAILED DESCRIPTION

Herein, when a range such as 5-25 (or 5 to 25) is given, this means preferably at least 5 and, separately and independently, preferably not more than 25. In an example, such a range defines independently not less than 5, and separately and independently, not less than 25.

A device and method of using the same has been discovered for an efficient, cost-effective means for cavitationally treating a fluid, for example a diverse liquid system, mixture, solution, suspension or emulsion. It has been found that by selectively directing fluid jets within a device to form secondary jets, those secondary jets can be intersected within the device to generate a rapid flow having a high intensity vortex movement of the fluid. This vortex movement of the fluid within the device can reduce local pressure in the fluid sufficient to form cavitation bubbles in the fluid. Collapse of the cavitation bubbles, for example, under a static pressure, can thereby cavitationally treat the fluid flowing through the device.

Figure 1:
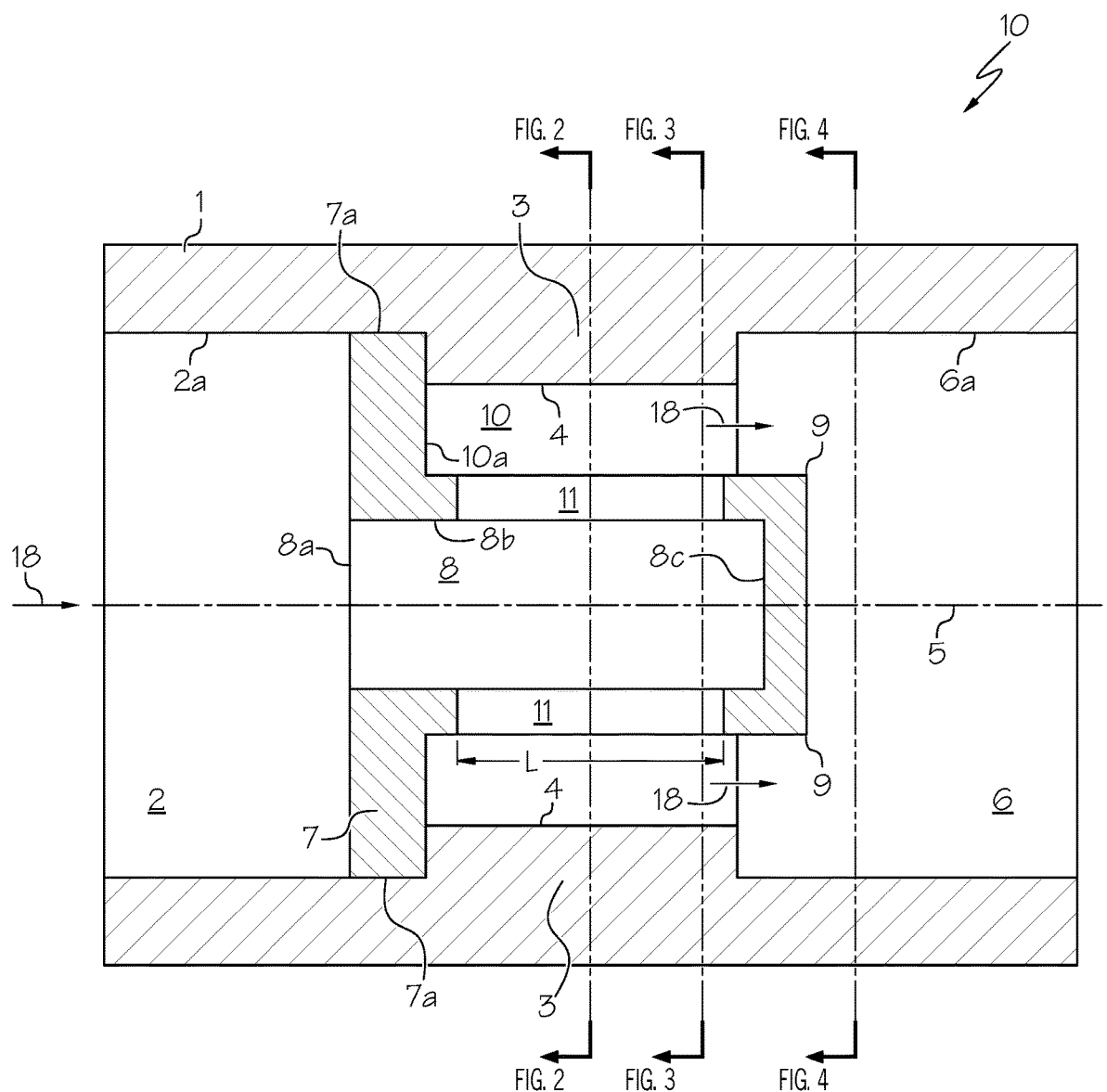
FIG. 1 shows a longitudinal cross-sectional view of one embodiment of a device for cavitationally treating a fluid or liquid disperse system.

As illustrated in a longitudinal, cross-sectional view in the diagram of FIG. 1, one embodiment of a device for cavitationally treating a fluid is shown. The device 10 is a static device and does not contain moving parts, for example, to generate hydrodynamic cavitation in a fluid. The device 10 has a housing 1 having a longitudinal axis 5. The housing 1 defines a fluid inlet 2 for introducing fluid into the device and a fluid outlet 6 for discharging fluid out of the device. Housing 1 can be any suitable shape, for example, housing 1 can be a cylinder having an opening therethrough along its length, for example, defined by inner surface portions 2a and 6a and wall 4. For instance, the housing 1, depending on capacity of the device, can have a diameter in the range of 30 to 2,000 mm, 50 to 1,000 mm, 75 to 500 mm or 100 to 250 mm. The diameter of the housing can be constant along its length, or constant in one or more regions. As shown, the housing 1 diameter is constant in the fluid inlet and outlet portions defined by inner surface portions 2a and 6a.

Housing 1 can have a chamber-forming portion 3 that includes a wall surface 4. The chamber-forming portion 3 can be flush with the remaining inner surface, e.g., 2a, 6a, of the housing 1 or extend radially inward into the housing opening. As shown, wall surface 4 is cylindrical and extends radially inward from radial inner surfaces 2a, 6a. The chamber-forming portion 3 can be integral or unitary with housing 1, for example, it can be molded or formed from a single piece of material as housing 1. In another example, the chamber-forming portion 3 can be a separate piece from the housing 1, e.g., an insert, a ring or tube, which can be mounted within the opening of the housing.

The housing 1 has a cylindrical insert 7 mounted coaxially within or inside the housing, for example, within the chamber-forming portion 3 of the housing 1 or within at least a section of the chamber-forming portion 3. Cylindrical insert 7 has an internal channel 8 open along its length in the longitudinal direction from the inlet opening 8a to the closed end 9 downstream of the opening 8a. The inlet opening 8a is preferably circular. The inlet opening 8a can be connected, for example in an integral or unitary manner, to a mounting portion that extends from the inlet area to be in contact with an inner surface or wall of the housing 1. As shown, the mounting portion of insert 7 is at the upstream end and extends radially outward from the internal channel 8 inlet area to contact the inner wall of housing 1 to secure the insert 7. The insert 7, e.g., the mounting portion of the insert 7, can be permanently secured to housing 1 by suitable means such as welding. As discussed below, the mounting portion of the insert connecting to housing 1 can define a portion of the annular cavity, e.g., surface 10a at the upstream end.

Preferably, the internal channel 8 has a constant diameter along its length, for example, an inner diameter of 5 to 1,000 mm, 10 to 500 mm, 20 to 250 mm or 30 to 100 mm. The internal channel 8 is partially defined by inner wall surface 8b and closed end surface 8c that can be a circular surface.

Figure 2:
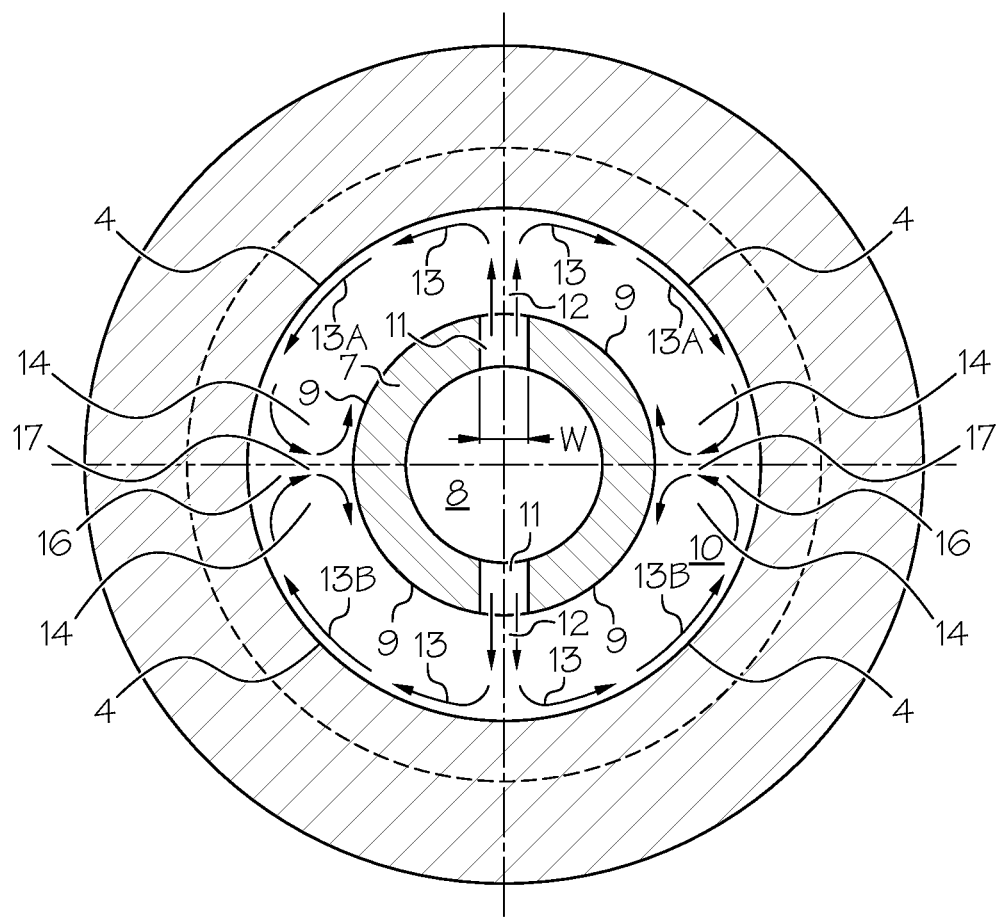
FIG. 2 shows a cross-sectional view of the device taken along line FIG. 2 of FIG. 1.

The cylindrical insert 7 can include at least two slot openings 11 along its length and oriented in line with or parallel to the housing longitudinal axis 5. The slot openings can have any suitable shape, for example, rectangular with the length (L) of the slot opening being oriented in the longitudinal axis 5 direction of the housing, for instance, as shown in FIG. 1. Width (W) of the slot opening is viewed perpendicular to length (L), for example, as illustrated in FIG. 2. The ratio of length to width of the slot openings, L:W or L/W, can be at least 1, 1.5, 2, 2.5, 3, 3.5, 4, 4.5, 5, 5.5, 6, 6.5, 7, 7.5, 8, 8.5, 9, 9.5, 10, 10.5, 11, 12, 13, 14, 15, 16, 18, 20 or 24, and alternatively can be not more or less than 50, 40, 30, 25, 20, 18, 16, 15, 14, 13, 12, 11, 10, 9, 8, 7.5, 7, 6.5, 6, 5.5, 5, 4.5, 4, 3.5, 3, 2.5, 2 or 1.5. The slot openings 11 are preferably spaced equally apart from one another along the inner wall surface 8b that defines the internal channel 8 in the cylindrical insert 7. For example, two slot openings as shown can be opposite one another or 180 degrees apart from one another in the wall defining the internal channel 8. The cylindrical insert 7 can have more than two slot openings, for example, at least 3, 4, 5, 6, 7, 8, 9, 10, 11, 12, 14, 16, 18 or 20 or more slot openings, preferably evenly spaced around the insert, and arranged in the wall defining the internal channel of the insert.

The slot openings 11 function to fluidly connect through an opening the internal channel 8 to the annular cavity 10 that annularly surrounds a portion of channel 8. The annular cavity 10 is an open annular space that extends in the longitudinal axis 5 direction along and in between the outer surface of channel 8 of the cylindrical insert 7 and cylindrical wall 4 of the chamber-forming portion 3. The upstream end of the annular cavity 10 is closed and defined by surface 10a. Slot openings 11 are the fluid inlet to the annular cavity 10. The annular cavity 10 is open and in fluid communication with the fluid outlet 6 of housing 1 along its downstream end.

In one or more embodiments, housing 1 can have one or more cylindrical inserts 7 mounted therein, for example, at least 1, 2, 3, 4, 5, 6, 7, 8, 9, 10 or more cylindrical inserts 7 can be arranged one after the other, in series, in the direction of flow along longitudinal axis 5. A fluid can be cavitationally treated multiple times by having multiple cylindrical inserts 7 positioned in series within one housing 1. In another embodiment, one or more housings 1, each having at least on cylindrical insert 7, can be positioned in series with one another to cavitationally treat a fluid multiple times.

In operation, a hydrodynamic fluid, e.g., liquid, flow moves along the direction indicated by arrow 18 through inlet 2 and flows directly into internal channel 8 of insert 7. Preferably, cylindrical insert 7 is mounted in housing 1 such that the entire amount of fluid entering inlet 2 is forced into internal channel 8 through inlet 8a. Fluid flows into internal channel 8 of the insert 7 and is forced through slot openings 11 and directly into annular cavity 10. As fluid passes through the slot openings 11 into the annular cavity 10, primary fluid jets 12, e.g., radial flat high velocity jets, are formed. As shown in FIG. 2, primary fluid jets exit slot openings 11 and are directed to contact wall 4 of the annular cavity 10. Preferably, the primary fluid jets 12 have a velocity of at least 8, 10, 12, 14, 15, 20, 25, 30, 40, 50, 70, 90 or 100 meters per second.

The primary fluid jets 12 are deflected or split from colliding with wall 4 of the annular cavity 10. Each primary fluid jet 12 exiting the slot openings deflects from wall 4 to generally divide and form two secondary fluid jets 13, 13A, 13B. The secondary fluid jets 13 travel tangentially to or along cylindrical wall 4 of the annular cavity, for example, as shown in FIG. 2. The annular wall surface 4 of cavity 10 guides the secondary fluid jets 13A, 13B such that the jets collide with or interact with another secondary fluid jet 13, e.g., near location 16, to generate a jet or rapid flow at the intersection point 17 to form a high intensity vortex movement 14 of the fluid within the annular cavity 10. The vortex movement of the colliding jets 13 can be sufficient to reduce local pressure within the fluid, e.g., a zone or core of the vortex, to form cavitation bubbles in the fluid within the annular cavity 10.

During the collapse of the cavitation bubbles, localized pressures in the fluid can range up to 200, 400, 600, 800 or 1,000 MPa, which can result in an intensive dispersing influence on the volume of processed fluid or components located in the annular cavity 10 or in the housing outlet. The level of energy dissipation in the cavitation zone can attain a magnitude in the range of $1^{10}$-$1^{15}$ watt/kg, e.g., at least $1^{10}$, $1^{11}$, $1^{12}$, $1^{13}$, $1^{14}$ or $1^{15}$, watt/kg, thereby allowing the production of very finely dispersed suspensions, emulsions and dispersions. The cavitation zone is generated in cavity 10 and can extend to the outlet region of housing 1. In most cases, the particle sizes of the dispersions are found at the submicron level after the fluid containing particles is cavitationally treated in the device. After passage of the fluid through the cavitation bubble zone in the annular cavity, the flow of processed fluid exits or is discharged from annular cavity 10 as shown in FIG. 1 at arrows 18 into and through outlet 6 of the device 10.

The hydrodynamic fluid or liquid flow may be comprised of a mixture of two or more liquid components (including those now known in the art) such as one liquid soluble in one of the components as well as mutually insoluble liquids, for example, in the form of emulsions. Furthermore, in the fluid or liquid media being processed in the device, there may be found hard material particles, such as particles that exhibit the characteristics of a solid or a high viscosity liquid, which appear as either one of the reactants, or performs the function of a catalyst. There may also be particles of one or more or several hard components present in the fluid flow. All fluids which are known in the art to be processed through a conventional hydrodynamic cavitation apparatus, including fluids containing hard or solid particles, can be processed through the device of the present disclosure. All of this allows for additional practical application of the invented device and method, for example, this method can find application in the chemical, petroleum, food, cosmetic, pharmaceutical and other industries.

In one or more embodiments, the fluid can contain particles, e.g., hard or solid particles, that can have a higher density than the fluid being introduced into the device. The particle-containing fluid can be deflected off of wall 4 as it exits slot openings 11 and the dense particles in the fluid can be split into two streams and travel on or near the wall surface as compared to the bulk of the fluid that has a lesser density. The particles from the two streams can intersect as they travel tangentially along wall 4 of the annular cavity and collide with one another, e.g., at or near location 16 as shown in FIG. 2. The collision of particles can reduce particle size within the fluid and the cavitationally treatment of the fluid can separately or further reduce the particle size within the fluid as a result of the high shear force and collapse energy generated as the cavitation bubbles are formed and collapsed within the device.

Figure 3:
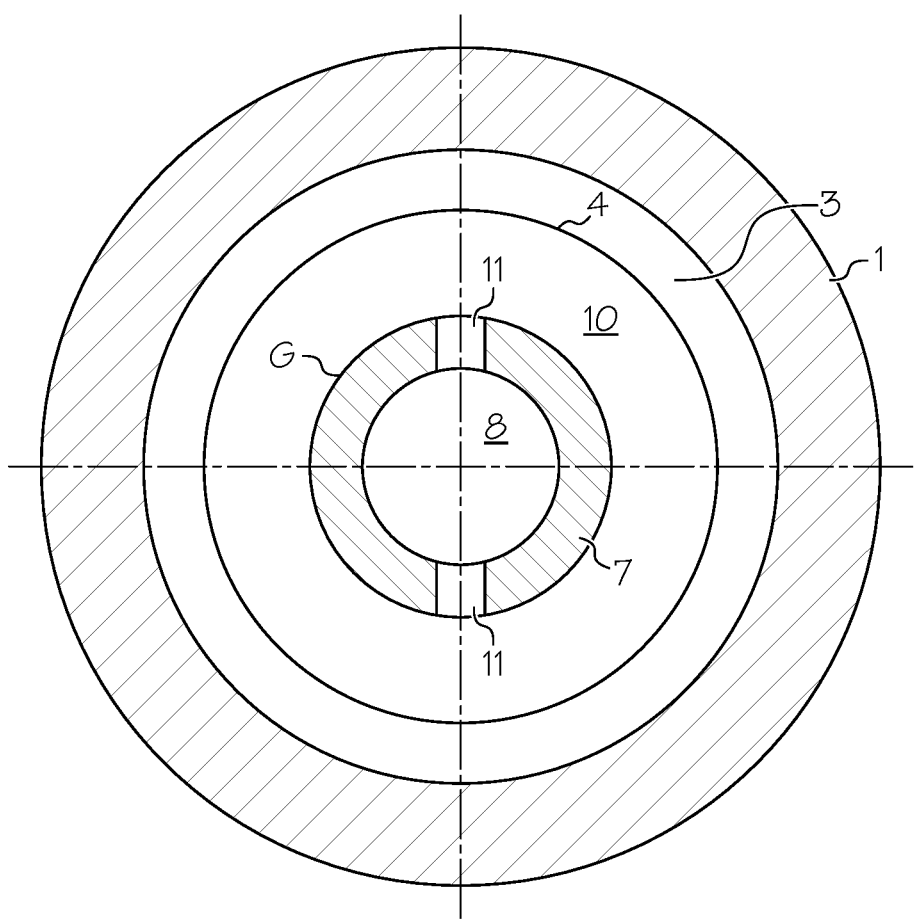
FIG. 3 shows a cross-sectional view of the device taken along line FIG. 3 of FIG. 1.

FIG. 3 shows another cross-sectional view of the device 10 of FIG. 1 for cavitationally treating a fluid. Housing 1 encloses annular cavity 10 that is defined by wall surface 4 at its radial innermost portion and the outer radial surface of insert 7 at its radial outermost portion. Insert 7 defines the internal channel 8 for introducing fluid to pass through slot openings 11 and into cavity 10 for generating a reduction in pressure sufficient to induce a field of cavitation bubbles in the fluid.

Figure 4:
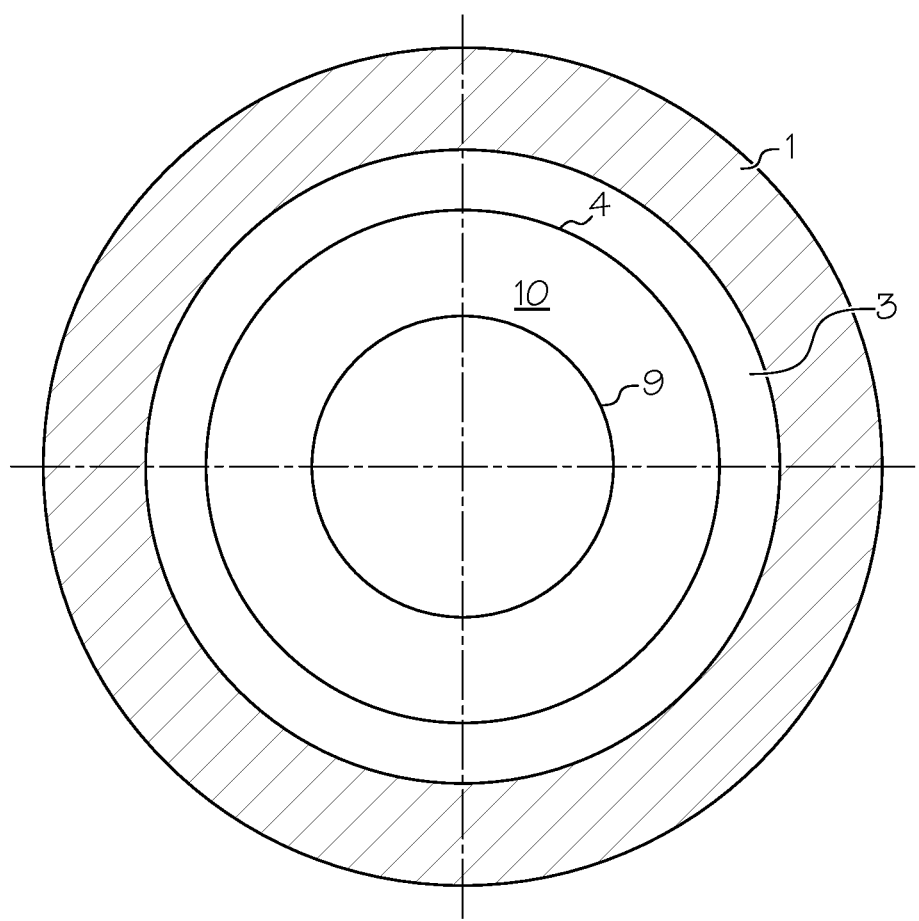
FIG. 4 shows a cross-sectional view of the device taken along line FIG. 4 of FIG. 1.

FIG. 4 shows another cross-sectional view of the device 10 of FIG. 1 for cavitationally treating a fluid. Housing 1 encloses annular cavity 10 that is defined by wall surface 4 of the chamber-forming portion 3 at its radial innermost portion and the outer radial surface of insert 7 at its radial outermost portion. Insert 7 has a closed end surface 9 positioned coaxially in the housing and surface 9 defines the downstream end of the internal channel 8. Surface 9 of the closed end forces fluid in internal channel 8 through slot openings 11 for introducing fluid to cavity 10.

It will be understood that this invention is not limited to the above-described embodiments. Those skilled in the art having the benefit of the teachings of the present invention as hereinabove set forth, can effect numerous modifications thereto. These modifications are to be construed as being encompassed with the scope of the present invention as set forth in the appended claims.

What is claimed:

1. A method for cavitationally treating a fluid, comprising the steps of:
   a. providing a housing comprising a fluid inlet, a fluid outlet, a chamber-forming portion which defines a cylindrical wall, and a longitudinal axis;
   b. providing a cylindrical insert mounted coaxially within said chamber-forming portion, the cylindrical insert comprising an internal channel with an inlet opening in fluid communication with the fluid inlet of the housing, the cylindrical insert comprising a closed end downstream of the inlet opening in the cylindrical insert and at least two slot openings in the cylindrical insert positioned between the inlet opening and the closed end, the at least two slot openings being in fluid communication with the internal channel of the cylindrical insert and an annular cavity positioned between an outer surface of the cylindrical insert and the chamber-forming portion of the housing;
   c. delivering the fluid to be treated into the internal channel of the cylindrical insert;
   d. supplying a flow of the fluid through the at least two slot openings into the annular cavity in the form of two primary fluid jets;
   e. deflecting each of the two primary fluid jets from the cylindrical wall of the housing to divide each primary fluid jet into two secondary fluid jets directed tangentially along the cylindrical wall of the housing in opposite directions and intersecting the two secondary fluid jets of each primary fluid jet and generating a high intensity vortex movement of the fluid within the annular cavity sufficient to reduce pressure in a zone of the vortex movement to form cavitation bubbles in the fluid in the annular cavity; and
   f. discharging the fluid from the annular cavity into the fluid outlet and collapsing the cavitation bubbles under static pressure.

2. The method of claim 1, the two primary fluid jets having a fluid velocity of at least 8 meters per second.

3. The method of claim 1, further comprising a step of repeating the method a plurality of times within the housing, the step of repeating the method comprising passing the fluid through a plurality of cylindrical inserts positioned in series within the housing.

4. The method of claim 1, the cavitation bubbles being collapsed in the fluid outlet of the housing.

5. The method of claim 1, one of the at least two slot openings in the cylindrical insert being capable of orienting fluid flow therethrough perpendicular to the longitudinal axis and the cylindrical wall of the housing.

6. The method of claim 1, the cylindrical insert mounted within the housing such that an entire amount of the fluid flowing into the fluid inlet of the housing flows into the inlet opening of the cylindrical insert.

7. The method of claim 1, the at least two slot openings being equally spaced apart in the cylindrical insert.

8. The method of claim 1, the cylindrical insert comprising a mounting portion, the mounting portion being in contact with the cylindrical wall of the housing.

9. The method of claim 8, the mounting portion of the cylindrical insert being an integral extension of a wall that forms the inlet opening of the internal channel of the cylindrical insert.

10. The method of claim 1, the fluid outlet comprising an inner surface and the annular cavity extending between an outer surface of the cylindrical insert and cylindrical wall of the chamber-forming portion, wherein the cylindrical wall of the chamber-forming portion of the annular cavity extending radially inward toward the longitudinal axis from the inner surface of the fluid outlet.

* * * * *